United States Patent [19]

Snel et al.

[11] Patent Number: 5,683,318
[45] Date of Patent: Nov. 4, 1997

[54] METHOD FOR INFLUENCING THE TENSION IN A DRIVE BELT

[75] Inventors: Peter Jaap Snel, Waalre; Arjen Brandsma; Paulus Maria Smeets, both of Tilburg; Johannes Hendrikus Van Lith, Berlicum, all of Netherlands

[73] Assignee: Van Doorne's Transmissie B.V., Tilburg, Netherlands

[21] Appl. No.: 723,984

[22] Filed: Sep. 27, 1996

[30] Foreign Application Priority Data

Oct. 5, 1995 [NL] Netherlands .............. 1001345

[51] Int. Cl.⁶ .............................. F16H 61/00
[52] U.S. Cl. .................. 474/11; 474/18; 474/28
[58] Field of Search .................. 474/8, 11, 18, 474/28

[56] References Cited

U.S. PATENT DOCUMENTS

| | | | |
|---|---|---|---|
| 4,458,318 | 7/1984 | Smit et al. | 474/28 X |
| 4,702,725 | 10/1987 | Kouno et al. | 474/28 |
| 4,718,308 | 1/1988 | Haley | 474/28 X |
| 4,731,044 | 3/1988 | Mott | 474/17 X |
| 5,085,107 | 2/1992 | Tatara | 474/12 X |

FOREIGN PATENT DOCUMENTS

| | | |
|---|---|---|
| 0 004 412 | 10/1979 | European Pat. Off. . |
| 0 086 534 | 8/1983 | European Pat. Off. . |
| 0 157 050 | 10/1985 | European Pat. Off. . |
| 0 436 974 | 7/1991 | European Pat. Off. . |
| 8205048 | 7/1984 | Netherlands . |

*Primary Examiner*—Roger J. Schoeppel
*Attorney, Agent, or Firm*—Young & Thompson

[57] ABSTRACT

The invention relates to a method for influencing the tension in a drive belt in a continuously variable transmission. According to the invention, the tensions in the drive belt are determined as a function of the speed of the drive belt. For part, parts or the entire range of the possible input speeds of the transmission, the input speed of the transmission is then increased and/or reduced to a desired speed range for the drive belt with an essentially relatively lower tension in the drive belt. The power density, the efficiency and the control range of the transmission can be improved by application of this method.

9 Claims, 6 Drawing Sheets

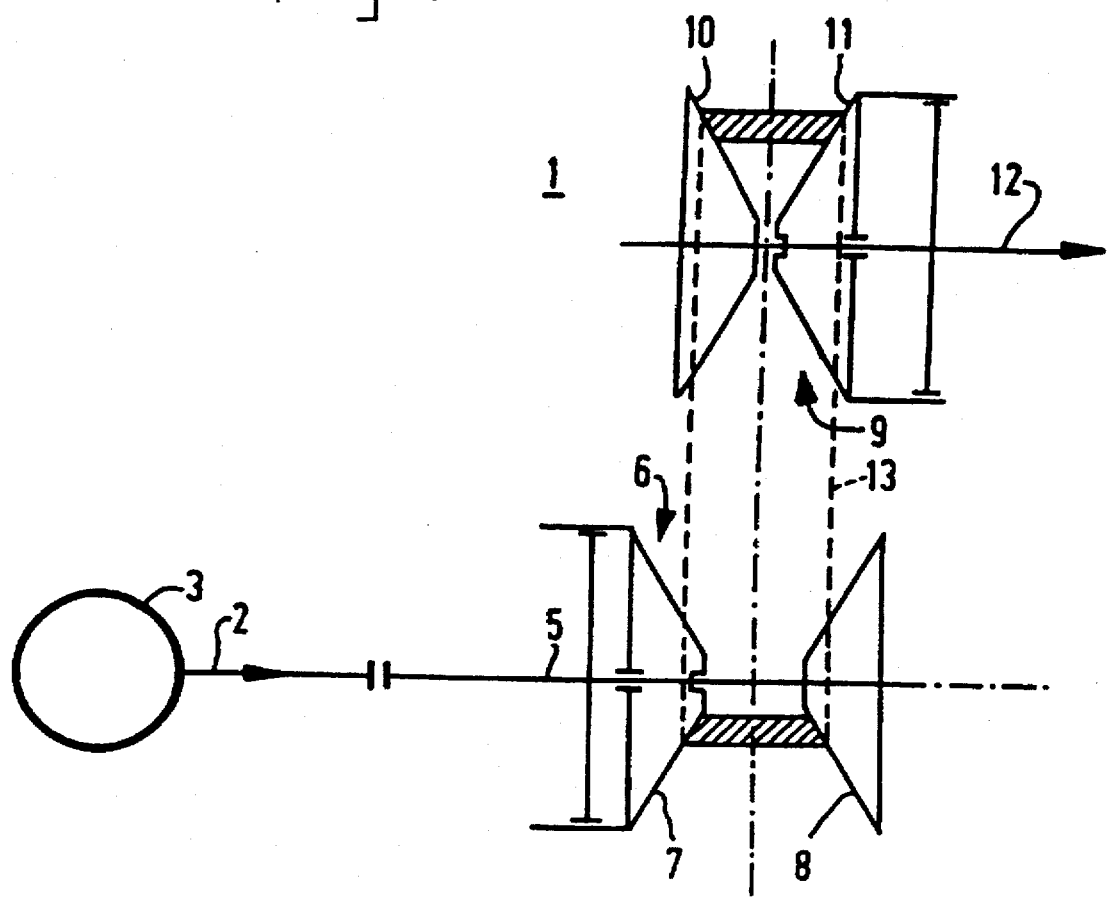

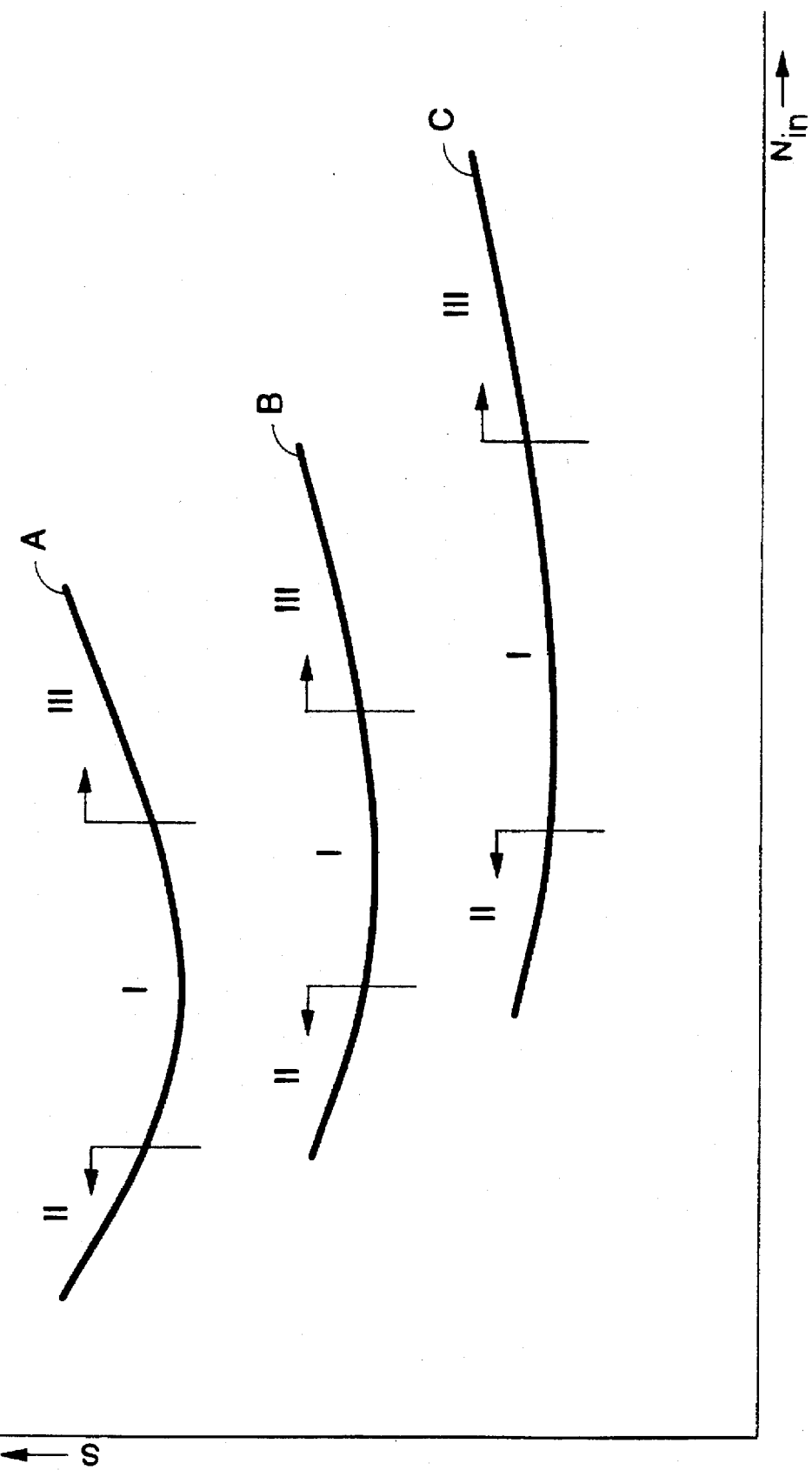

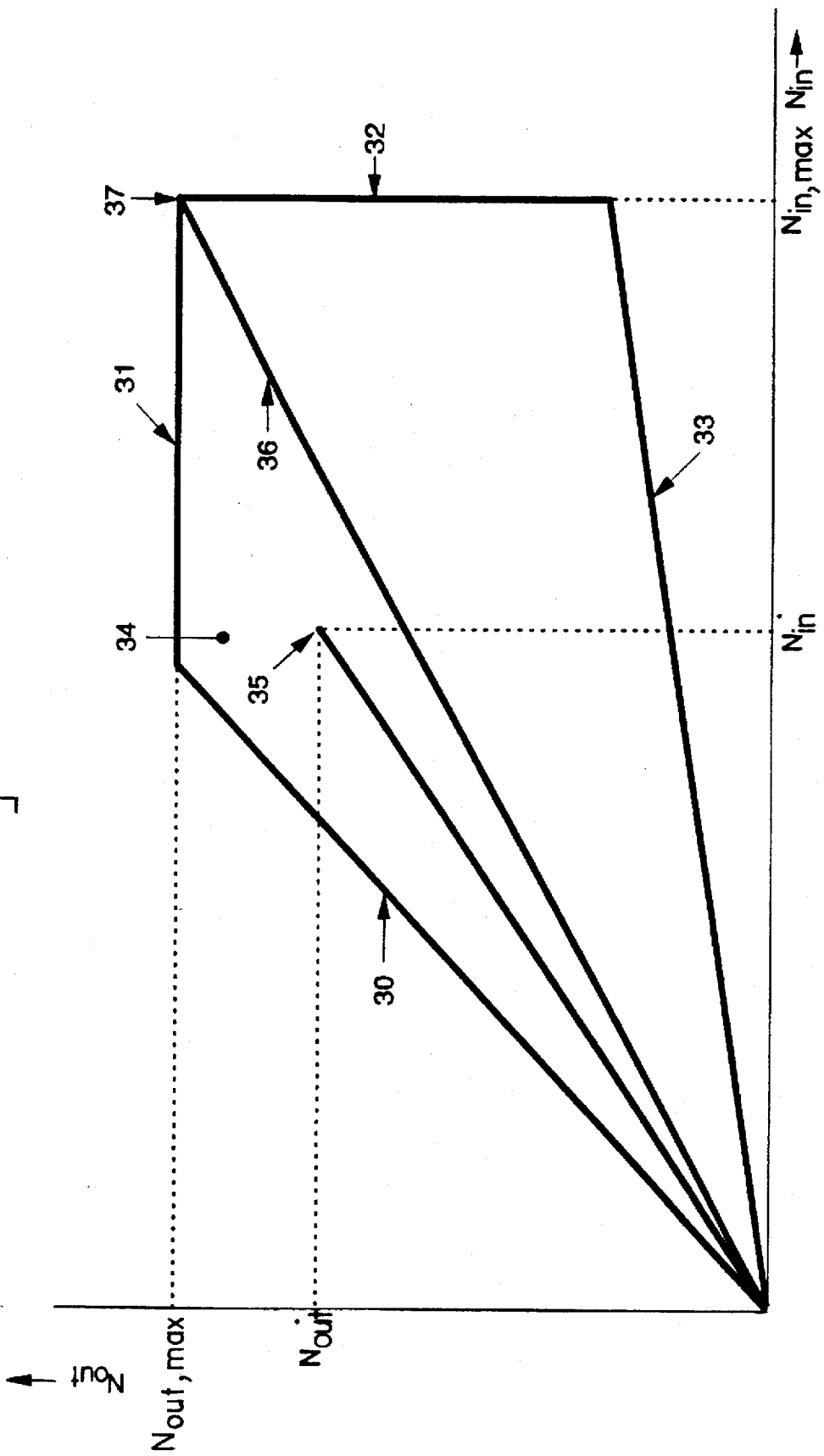

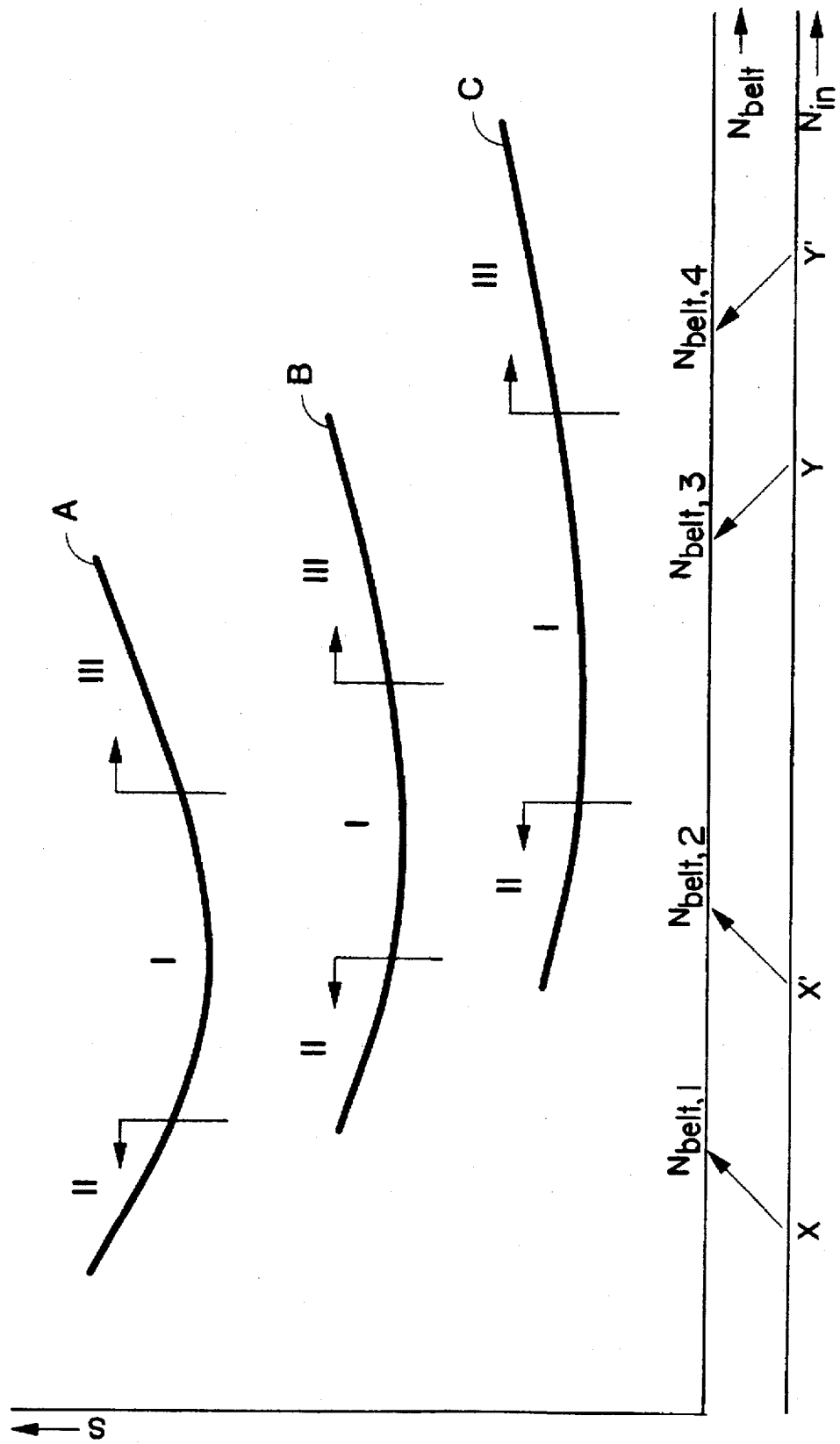

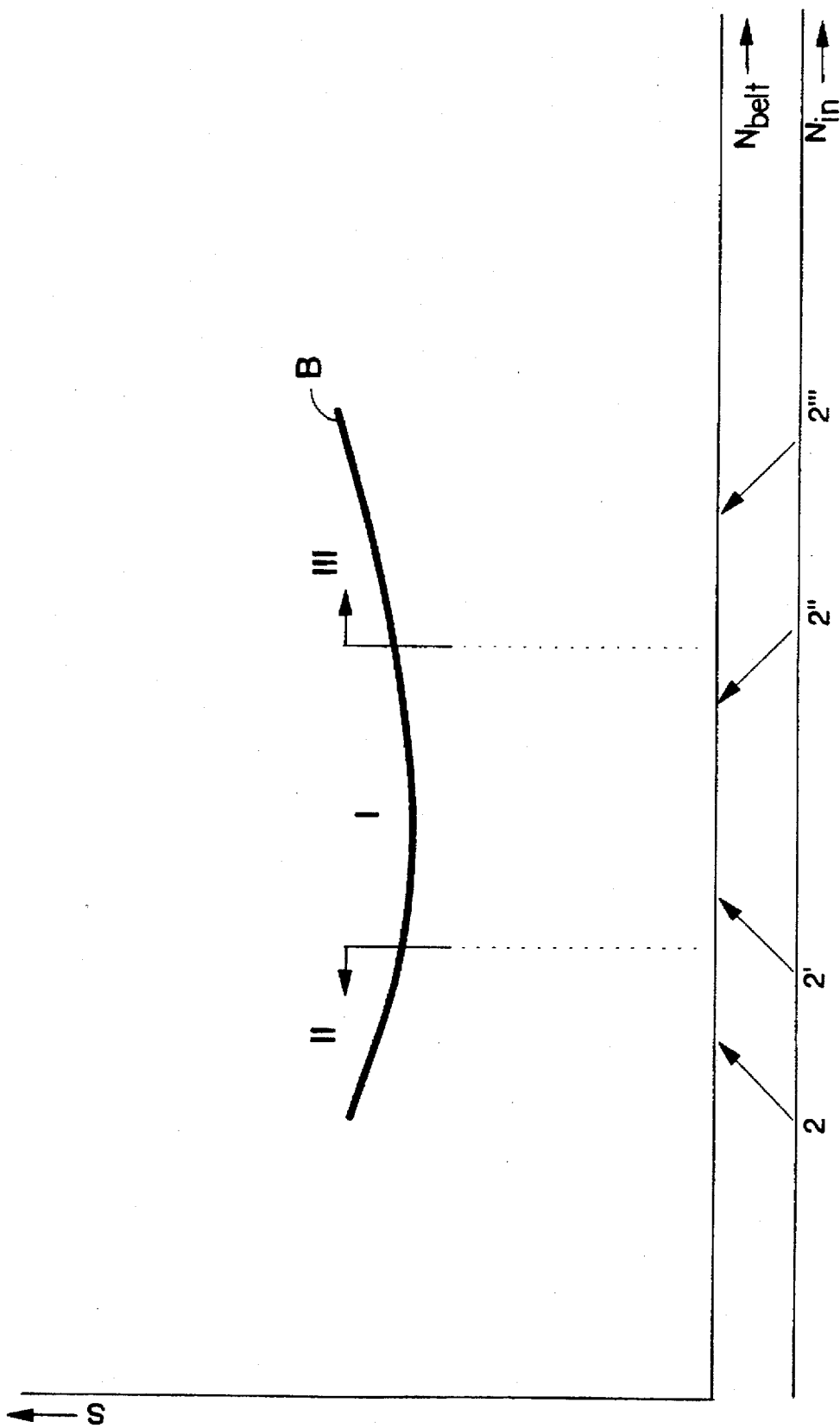

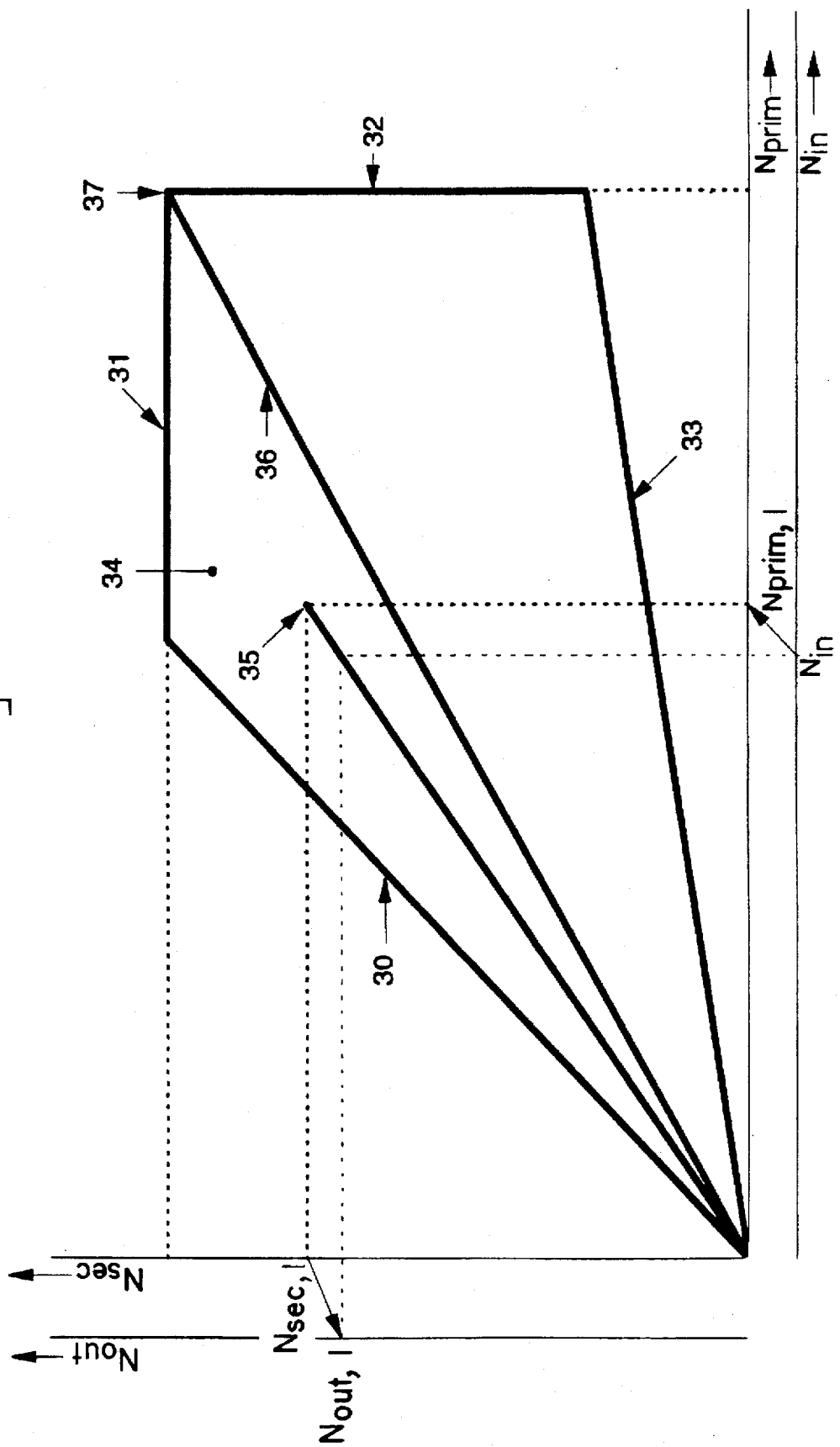

METHOD FOR INFLUENCING THE TENSION IN A DRIVE BELT

The invention relates to a method for influencing the tension in a drive belt in a continuously variable transmission.

Such a continuously variable transmission with drive belt is disclosed, for example, in European Patent EP 0 436 974 and is used in motor vehicles in particular. A continuously variable transmission of this type essentially comprises two pulleys and a drive belt arranged between the pulleys. Each pulley has two discs, the drive belt being accommodated in a slit between the discs. By changing the radial position of the drive belt between the pulleys, an infinite number of transmission ratios can be obtained within a certain control range. The radial position of the drive belt in the pulleys can be changed in that at least one disc of each pulley is axially movable.

It is known from European Patent 0 436 974 that, when a torque converter is used, a temporary increase in the tension of the drive belt to above a certain fatigue value is acceptable when driving away the motor vehicle. However, the tension in the drive belt cannot be increased to above the fatigue value, and certainly not to above the breaking point, over the entire range of input speeds of the transmission and for a prolonged period. The transmission and drive belt must therefore also be of sufficiently heavy-duty construction to be able to transmit the full power even in the case of the most adverse input speeds of the transmission. The compactness, the power density, the efficiency and the control range are limited as a result.

The aim of the invention is to overcome the abovementioned drawbacks by optimum loading of the drive belt, to provide a high power density, high efficiency and a wide control range.

The method according to the invention is characterised in that the tension in the drive belt is determined as a function of the speed of the drive belt and in that, for part, parts or the entire range of the possible input speeds of the transmission, the input speed of the transmission is increased and/or reduced to a desired speed range for the drive belt with an essentially relatively lower tension in the drive belt. In this way the power can be transmitted by the drive belt even in the case of adverse input speeds without the tensions in the drive belt becoming unacceptedly high and without the transmission and the drive belt having to be of heavy-duty construction. The compactness, the power density, the efficiency and the control range are improved as a result.

According to further developments of the invention, the input speed of the transmission is reduced or increased to the desired speed of the drive belt and, for part, parts or the entire range of the possible speeds of the drive belt, the speed of the drive belt is increased or reduced to the desired output speed of the transmission. What is achieved in this way is that the reduction or increase in the input speed to the desired speed of the drive belt is at least partially corrected by increasing or, respectively, reducing the speed of the drive belt again to the output speed of the transmission. According to the invention the part, parts or the entire range of the input speed for which the speed is reduced or increased adjoins the part, parts or the entire range for which the speed of the drive belt is increased or reduced to the output speed. In this way, although the tensions in the drive belt are limited, the relationship between the input and output speeds of the transmission remains unchanged, certainly if the same factor is used for the input speed and for the speed of the drive belt. The factor for increasing the input speed of the transmission is preferably between 1.1 and 3.5, whilst the factor for reducing the input speed of the transmission preferably has a value of between 0.35 and 0.9.

According to the invention the input speed of the transmission can be adjustable as a function of the transmission ratio of the transmission.

The invention also relates to a continuously variable transmission which can be operated in accordance with the method described.

The invention will be explained with reference to a drawing. In the drawing:

FIG. 1 shows, diagrammatically, a continuously variable transmission according to the prior art;

FIG. 2A shows tension curves for a drive belt as a function of the speed;

FIG. 2B shows a variogram of a transmission according to the prior art;

FIG. 3A shows tension curves for a drive belt operated in accordance with the method according to the invention;

FIG. 3B shows tension curves for a drive belt operated in accordance with the method according to the invention, as a function of the speed; and FIG. 4 shows a variogram of a continuously variable transmission operated in accordance with the method according to the invention.

The continuously variable transmission 1 shown diagrammatically in FIG. 1 is connected by means of an input shaft 5 to the output shaft 2 of a drive unit 3. The transmission 1 comprises two pulleys 6 and 9, which have discs 7, 8 and 10, 11, respectively, which are mounted on the input shaft 5 and, respectively, the output shaft 12. The discs 7 and 11 are axially movable, so that the radial position of the drive belt 13, located between the pulleys 6 and 9, and thus the transmission ratio of the transmission can be varied.

FIG. 2A shows a graphical representation of the load curve in which, for constant power, the tension S in the drive belt 13 is plotted on a the vertical axis as a function of the speed of the input shaft 5. Three load curves are shown for different transmission ratios. The transmission ratio with the lowest value (the highest acceleration) results in curve A, whilst curve C is obtained with an average transmission ratio. All curves have an intermediate region I of relatively low tensions and fringe regions II and III of relatively high tensions. In fringe region II the tension is determined in particular by the torque to be transmitted, whilst in fringe region III the tension is determined in particular by the centrifugal action on the belt. The degree to which the drive belt 13 is driven into the fringe regions II and III is partly dependent on the conditions under which the transmission is used, for example whether or not a motor vehicle is driven fast and/or accelerated fast, as well as on the nature of the drive unit 3. For a diesel engine the low-speed region II will predominate, whilst for a high-revving petrol engine, region III will predominate. Because the fatigue strength and the breaking strength of the belt may, in principle, not be exceeded, the fringe regions II and III delimit the compactness, the power density, the efficiency and the control range of the drive belt and the transmission.

FIG. 2B shows a variogram of a continuously variable transmission according to the prior art. The lines 30, 31, 32 and 33 enclose a field 34 with all possible combinations of the output speeds $N_{out}$, plotted on the vertical axis, and the input speeds $N_{in}$, plotted on the horizontal axis. The input speed $N_{in}$ is a measure for the engine speed, whilst the output speed $N_{out}$ is a measure for the speed of the motor vehicle. The transmission ratio of the continuously variable transmission is determined by the ratio between the input speed $N_{in}$ and the output speed $N_{out}$ at a given point in time, as is indicated, for example, in FIG. 2B by the working point 35. Within the field 34, the transmission ratio can be adjusted to an infinite number of values.

Line 30 gives the lowest transmission ratio (=the highest acceleration) and line 33 the highest transmission ratio (=the lowest acceleration). Line 31 indicates the limit of the maximum permitted output speed $N_{out}$ for the various transmission ratios, whilst line 32 gives the limit for the maximum permitted input speed $N_{in}$ for different transmission ratios.

Frequently the location of line 32 in the variogram is determined by the maximum permitted speed of the engine, whilst the maximum speed of the vehicle determines the location of line 31.

The transmission ratio, which is given by line 36, represents the transmission ratios at which the motor vehicle can achieve the maximum vehicle speed $V_{max}$ with the limited maximum input speed $N_{in,\ max}$. This working point of maximum primary speed and maximum vehicle speed is indicated by the reference numeral (37).

FIG. 3A again shows that the tensions in the drive belt 13 have been determined, this time as a function of the speed $N_{belt}$ of the drive belt 13. Here the speed $N_{belt}$ of the drive belt has been separated from the input speed $N_{in}$ of the transmission. In this case the separation has taken place in particular for the sub-regions $X-X^1$ and $Y-Y^1$. For the sub-region $X-X^1$ the input speed $N_{in}$ has been increased to the higher speed range $N_{belt1}-N_{belt2}$ of the drive belt. For the sub-region $Y-Y^1$ the input speed $N_{in}$ has been reduced to the lower speed range $N_{belt3}-N_{belt4}$. It will be clear that as a result of this method the drive belt 13 is driven over a narrower speed range $N_{belt}$ with an essentially relatively lower tension in the drive belt.

Incidentally, it is not necessary according to the invention to increase or to reduce the input speed $N_{in}$ of the transmission for multiple sub-regions. Thus, depending on the specific application conditions, the input speed $N_{in}$ can be increased or reduced over the entire range, by which means an essentially relatively lower tension in the drive belt is likewise obtained. For example, in combination with a low-revving diesel engine as the drive element 3, good results are obtained if the input speed $N_{in}$ is increased over the entire range. On the other hand, in combination with a high-revving engine as drive element 3, an advantageous result can once again be obtained according to the invention by reducing the input speed $N_{in}$ over the entire range. In all cases the result is that the transmission acquires a higher power density and better efficiency as well as a wider control range and often can be more compact.

Particularly suitable factors by which to increase the input speed have been found to lie between 1.1 and 3.5, whilst for a reduction in speed the factor lies between 0.35 and 0.9.

Incidentally, the various features can be achieved in practice by, for example, using an accelerating and/or decelerating step, for example by incorporating a gear wheel group in the transmission in the drive direction before the pulley 6, 9/drive belt 13 combination. Said accelerating or decelerating steps are preferably adjustable. The acceleration or deceleration of the input speed $N_{in}$ of the transmission can also be obtained by controlling this with the output speed of the drive element 3. As is indicated in FIG. 3A, the tension in the drive belt 13 is partly dependent on the transmission ratio A, B and C at that point in time. Therefore, according to the invention, the increase or reduction in the input speed of the transmission can be adjusted as a function of the transmission ratio of the transmission. This is shown in FIG. 3B for the transmission ratio B for which regions $Z-Z^1$ and $Z^{11}-Z^{111}$, respectively, of the input speed $N_{in}$ are, respectively, increased and reduced. It will be clear that, for adjustment as a function of the transmission ratio, these sub-ranges are in a different location for, for example, transmission ratio A from FIG. 3A than for transmission ratio B.

FIG. 4 shows a variogram which largely corresponds to that in FIG. 2B. In this case, however, an accelerating step has been inserted between the input shaft 5 of the transmission 1 and the pulley 6. This has, for example, the result that the input speed $N_{in1}$ of the transmission is translated into a speed $N_{prim1}$ of pulley 6, which speed is a measure for the speed of the drive belt. This, in turn, results in a speed $N_{sec1}$ of the secondary pulley 9. Without the accelerating step, the speed $N_{in1}$ would have resulted in an output speed of the transmission with a magnitude of $N_{out1}$. With the accelerating step, this speed would therefore be a speed of the magnitude of $N_{sec1}$. So as not to influence the functioning of the transmission 1 as a whole by the use of the method of the invention, it can, according to the invention, be desirable to employ a decelerating step, for example once again a gear wheel step, after the pulley 9, which decelerating step reduces the speed $N_{sec1}$ back to the output speed $N_{out1}$ which would have been obtained without the use of the method according to the invention. In the case of a reduction in the speed at the input of the transmission, it can, of course, be desirable to increase the speed again at the output. Preferably, the accelerating and, respectively, decelerating (sub-)ranges of the input speed of the transmission link up with the decelerating and, respectively, accelerating (sub-) ranges of the output speed. In this way, although the tensions in the drive belt are reduced no difference is found at the input and output of the transmission compared with those for a conventionally driven continuously variable transmission. Because of the correlation between torque and speed of the transmission, it is specified here that within the inventive concept and within the scope of protection torque can also be read in place of speed.

We claim:

1. Method for influencing the tension in a drive belt in a continuously variable transmission, characterised in that the tension in the drive belt is determined as a function of the speed of the drive belt and in that, for part, parts or the entire range of the possible input speeds of the transmission, the input speed of the transmission is increased and/or reduced to a desired speed range for the drive belt with an essentially relatively lower tension in the drive belt.

2. Method according to claim 1, characterised in that the input speed of the transmission is reduced to the desired speed of the drive belt and in that for part, parts or the entire range of the possible speeds of the drive belt, the speed of the drive belt is increased to the desired output speed of the transmission.

3. Method according to claim 1, characterised in that the input speed of the transmission is increased to the desired speed of the drive belt and in that for part, parts or the entire range of the possible speeds of the drive belt, the speed of the drive belt is reduced to the desired output speed of the transmission.

4. Method according to claim 1, characterised in that for the part, parts or the entire range of the input speed of the transmission for which the input speed has been increased or reduced to the desired speed of the drive belt, the speed of the drive belt is reduced or, respectively, increased to the desired output speed of the transmission.

5. Method according to claim 1, characterised in that the reduction or increase in the input speed of the transmission to the desired speed of the drive belt and the subsequent increase or, respectively, reduction in the desired speed of the drive belt to the desired speed of the transmission takes place by an approximately equal factor.

6. Method according to claim 1, characterised in that the increase in the input speed of the transmission preferably takes place by a factor of between 1.1 and 3.5.

7. Method according to claim 1, characterised in that the reduction in the input speed of the transmission preferably takes place by a factor of between 0.35 and 0.9.

8. Method according to claim 1, characterised in that the increase or reduction in the input speed of the transmission is adjusted as a function of the transmission ratio of the transmission.

9. In a continuously variable transmission comprising a drive belt and means for changing the tension in the drive belt; the improvement comprising means for setting the tension in the drive belt as a function of the speed of the drive belt, and means for changing the input speed of the transmission to a desired speed range for the drive belt with an essentially relatively lower tension in the drive belt.

* * * * *